Patented July 2, 1940

2,206,021

UNITED STATES PATENT OFFICE 2,206,021

CATALYTIC CRACKING AND CRACKING CATALYSTS

Ford H. Blunck, Chicago, Ill., assignor to Standard Oil Company, Chicago, Ill., a corporation of Indiana No Drawing. Application December 31, 1937, Serial No. 182,917

9 Claims. (Cl. 196—50)

This invention relates to the catalytic cracking of hydrocarbon materials and to synthetic cracking catalysts and methods of making them.

It is an object of my invention to provide improved methods of cracking petroleum fractions and other hydrocarbon materials, particularly to produce improved yields of high antiknock gasoline. Another object is to provide improved synthetic catalysts for such processes and a further object is to provide efficient and convenient processes for the manufacture of such synthetic catalysts. Still further and more detailed objects of my invention will become apparent as the description thereof proceeds.

Catalytic cracking processes are known which are superior in some respects to thermal cracking processes, particularly in that they produce greater yields of gasoline at a given temperature and moreover produce gasoline of higher antiknock rating than that produced by thermal cracking without catalysts. Furthermore, catalytic cracking can be carried out at about atmospheric pressure in relatively inexpensive apparatus while thermal cracking requires expensive apparatus, operating—as a rule—at high pressures.

I have discovered a new and superior catalyst for use in catalytic cracking. My new catalyst can be referred to as a synthetic boro aluminum silicate. However, it need not be a pure stoichiometrical chemical compound but can be a material of the general composition $$aB_2O_3 \cdot bAl_2O_3 \cdot cSiO_2$$

and may also suitably contain water of hydration. The oxides of boron, aluminum and silicon can be combined in any desired proportions to form solid solutions or loose chemical associations which are not bound by the rigid laws of stoichiometry. However, it is important that the $B_2O_3$, $Al_2O_3$ and $SiO_2$ be intimately associated with each other and not merely mechanically admixed. I therefore refer to my compositions as comprising boron oxide, aluminum oxide and silicon oxide in intimate molecular association.

In the general formula $aB_2O_3 \cdot bAl_2O_3 \cdot cSiO_2$, $a+b$ can be from about 0.1% to about 40% of $a+b+c$ and preferably from about 0.5% to about 15% of $a+b+c$. In other words, the composition can contain from about 0.1 to about 40 mol percent of $B_2O_3$ and $Al_2O_3$, and preferably from about 0.5 to about 15 mol percent of $B_2O_3$ and $Al_2O_3$ on an anhydrous basis. In addition, water of hydration can be and preferably should be present as indicated by the formula.

$$aB_2O_3 \cdot bAl_2O_3 \cdot cSiO_2 \cdot dH_2O$$

and $d$ can range up to numbers of the same general order of magnitude as $a+b+c$. Minor proportions of other substances can be present but I prefer that my catalyst be substantially free from other substances, which in general have deleterious effects on catalytic activity. However, catalyst support can, of course, be used as will hereinafter appear.

The ratio of $a$ to $b$ in the foregoing formulae can be varied widely. It can for instance range from about 1:100 to about 50:1, but preferably from about 1:10 to about 5:1.

One very desirable way of preparing a catalyst in accordance with my invention is to precipitate a silica gel by adding hydrochloric acid to a solution of water glass (sodium silicate). This gel can then be filtered and washed with distilled water. Solutions of a boron compound and an aluminum compound can then be added. Very substantial quantities of these compounds will be adsorbed on the silica gel. It is advantageous to digest the wet silica gel in the presence of a solution containing a boron compound and an aluminum compound for a considerable period of time, for instance several hours. The unadsorbed material can then be removed by repeated washing with water and the residue dried. The catalyst should be heated to approximately the temperature at which it is to be used before incorporating it in the catalyst chamber since otherwise it tends to shrink in volume when subjected to reaction conditions. The product thus produced may be referred to as boro aluminum silicate supported on hydrated silica.

The preferred boron compound used in making my catalyst by the above described method is boric acid since when the product is dried no residual radical is left in the final product other than that necessarily introduced along with the aluminum. However, other boron compounds, for instance borax (sodium tetraborate) can be used in place of the boric acid. The aluminum compound chosen can be an aluminum salt in which the aluminum is either in the anion or in the cation, for instance sodium aluminate or aluminum sulfate can be used.

Since only a small proportion of the total boron and aluminum compounds is adsorbed on the silica gel it is necessary to use a very considerable excess, for instance 10:1 as compared with the amount of $B_2O_3$ and $Al_2O_3$ desired in the final product.

It will be apparent that this procedure for making my boro aluminum silicate catalyst can be varied considerably. Thus, for instance, a solution of boric acid and aluminum sulfate can be added to a solution of water glass and the silica gel can be precipitated by the use of hydrochloric acid in the presence of the boron and aluminum compounds.

Furthermore, the boro aluminum silicate catalysts can be prepared by various dry methods as will be apparent to those skilled in the art.

Another manner in which boro aluminum silicates can be prepared and one which permits their preparation entirely uncontaminated with radicals other than $B_2O_3$, $Al_2O_3$ and $SiO_2$ is by reacting volatile halides of boron, aluminum and silicon with steam or water. Boron trifluoride, aluminum trichloride and silicon tetrachloride are suitable but other volatile halides including boron trichloride, aluminum tribromide, silicon oxychloride and silicon tetrafluoride can be used. The halide vapors can be generated separately and mixed in correct proportions and then precipitated with steam. They can, on the other hand, be conducted separately to the catalyst bed and adsorbed thereon. Steam can then be introduced to hydrolyze these halides. Water required for hydrolysis can be applied to the catalyst bed before applying the halide vapors. This method of preparing my boro aluminum silicate catalyst has the advantage that the catalyst bed can be regenerated by depositing a fresh surface of boro aluminum silicate thereon.

While my boro aluminum silicate catalyst can be used as such it also can be used to advantage deposited on a catalyst support in addition to hydrated silica. The catalyst support can be incorporated with a suspension of silica gel at the time of the adsorption of the boron compound and aluminum compound on the silica gel. The resulting cake after washing can be molded as desired, dried and employed as a cracking catalyst.

Instead of starting with separate compounds of boron, aluminum and silicon in the manufacture of my catalyst, it is possible to start with a natural clay, for instance fuller's earth or Attapulgus clay. Diatomaceous earth can also be used. One of these materials can be treated with acid, for instance by repeated washing with a dilute solution of hydrochloric or sulfuric acid, which not only has the advantage of removing impurities such as compounds of sodium, potassium and calcium but also and more important serves to reduce the aluminum content of the clay. After washing the clay with acid, it can suitably be washed with water and then digested with a solution of boric acid or other boron compound. The boron compound is adsorbed to a considerable extent on the surface of the clay. Washing and drying then produces a boro aluminum silicate product. Both this method of producing the boro aluminum silicate and the other methods described above have the advantage, as compared with the use of natural compounds which may contain boron and aluminum silicates, that the composition is controllable and a product results which is free or relatively free from undesired radicals, particularly from potassium, sodium and calcium which are in some instances deleterious and which at best serve to dilute the catalyst.

While I greatly prefer to adsorb a boron compound on acid treated clay, boro aluminum silicate catalysts can also be prepared by adsorbing boric acid on a clay or diatomaceous earth which has not been acid treated.

My catalysts can be used by placing them in a suitable catalyst chamber and then passing hot hydrocarbon vapors through the chamber. The most desirable charging stocks are petroleum fractions such as heavy naphthas (which can be "reformed" to improve their knock rating), kerosene and gas oil or any other charging stock boiling predominantly within the range which includes the boiling ranges of heavy naphtha and gas oil, in other words from about 200° F. to about 750° F. It is preferable that these charging stocks be virgin or substantially virgin in nature since cracked stocks tend to form carbon and this carbon masks the catalyst and makes frequent regeneration imperative.

The conditions prevailing in the cracking chamber can suitably include temperatures from about 700° F. to about 1150° F. but preferably from about 900° F. to about 1100° F. The pressure can most conveniently be approximately atmospheric but higher and lower pressures can be used, in fact any pressure up to several thousand pounds per square inch. Pressures of from about one-half atmosphere to about five atmospheres are preferred. Contact times from about one second to about one minute can be used but contact times of from about two seconds to about twenty-five seconds are particularly suitable. The optimum contact time is a function of the other conditions, particularly the temperature, as well as the nature of the stock to be cracked, and can readily be determined by experiment. For instance, a 35° A. P. I. gravity Mid-Continent gas oil can be cracked advantageously at about atmospheric pressure and a catalyst chamber temperature of about 1000° F. in the presence of a catalyst of the type described and the contact time can suitably be about 4 seconds.

My catalysts can be regenerated, after they become relatively inactive, by controlled blowing with oxygen-containing gases to remove the carbon deposited on the catalyst. For example, a mixture of air and flue gas can be used at a temperature of about 1000° F. The revivification operation can be accomplished without impairment of the activity of the catalyst by temperature regulation which can be accomplished by control of the rate of passage of revivification gas, control of its dilution, etc. Steam can be used in the revivification operation and it may also be desirable to introduce from about 1% to about 5% of steam with the stock charged to the cracking process.

"Promoters" can be used with my catalysts, particularly homogeneous (vapor phase) "promoters" such as hydrogen bromide, alkyl bromides, iodine, alkyl iodides, ethylene oxide, etc. Thus, for instance, a catalyst prepared by any of the methods above described can be used in a catalytic cracking operation together with 1% of normal butyl bromide added with the charging stock.

I claim:

1. A method of cracking a petroleum fraction boiling at least predominantly between about 200° F. and about 750° F. which comprises contacting said petroleum fraction with a boro aluminum silicate catalyst at a temperature of from about 700° F. to about 1150° F. for from about one second to about one minute, said catalyst having boron and aluminum oxides adsorbed on silica gel.

2. A method of cracking a petroleum fraction boiling at least predominantly between about 200° F. and about 750° F. which comprises contacting said petroleum fraction with a boro aluminum silicate catalyst at a temperature of from about 900° F. to about 1100° F. and a pressure of from about one-half atmosphere to about five atmospheres for from about two seconds to about twenty-five seconds, said catalyst having boron and aluminum oxides adsorbed on silica gel.

3. The method of preparing an artificial cracking catalyst adapted to the conversion of heavy hydrocarbon oils to gasoline comprising treating active silica alternately with an aqueous solution of boric acid and an aqueous solution of an aluminum compound, causing boron and aluminum compounds to be adsorbed on active silica washing said active silica with water to remove excess solutions and thereafter drying the resulting catalyst at an elevated temperature said catalyst having boron and aluminum oxides adsorbed on active silica.

4. A method of cracking hydrocarbon oil comprising contacting said oil at an elevated cracking temperature with a catalyst consisting essentially of boron, aluminum and silicon oxides, in molecular association, prepared by depositing the boron and aluminum oxides on active silica.

5. A cracking catalyst adapted to the conversion of heavy hydrocarbon oils to gasoline comprising boron, aluminum and silicon oxides in molecular association, prepared by adsorbing the boron and aluminum oxides on undried hydrated silica, said catalyst containing about 0.1 to about 40% of boron and aluminum oxides together with the ratio of said boron oxide to said aluminum oxide being from about 1:100 to 50:1.

6. The catalyst of claim 5 wherein the amount of boron and aluminum oxides together contained in said catalyst is about 0.5 to about 15% with the ratio of said boron oxide to said aluminum oxide being from about 1:10 to 5:1.

7. A synthetic cracking catalyst adapted to the conversion of heavy hydrocarbon oil to gasoline comprising essentially boron and aluminum oxides adsorbed on silica gel said catalyst having been prepared by treating undried hydrated silica gel with aqueous solutions of boron and aluminum compounds, adsorbing boron and aluminum oxides on said silica gel, removing the unadsorbed compounds, and drying the resulting product.

8. The method of preparing a synthetic cracking catalyst adapted to the conversion of heavy hydrocarbon oils to gasoline at cracking temperatures comprising treating undried hydrated silica gel with aqueous solutions of boron and aluminum compounds, adsorbing from said solutions boron and aluminum oxides on said silica gel, removing the unadsorbed boron and aluminum compounds from said silica gel, and drying the resulting material by heating to approximately cracking temperature.

9. A method of preparing a synthetic cracking catalyst adapted to the conversion of heavy hydrocarbon oils to gasoline comprising suspending undried hydrated silica gel in an aqueous solution containing a boron compound and an aluminum compound, adsorbing boron and aluminum oxides on said silica gel, removing the unadsorbed boron and aluminum compounds, and drying the resulting product.

FORD H. BLUNCK.